United States Patent [19]

Nikawa

[11] Patent Number: 4,483,549
[45] Date of Patent: Nov. 20, 1984

[54] VEHICLE TOWING TRAILER

[75] Inventor: Haruo Nikawa, Amagasaki, Japan

[73] Assignee: Toshiki Nikawa, Hyogo, Japan

[21] Appl. No.: 440,997

[22] Filed: Nov. 12, 1982

[30] Foreign Application Priority Data

Jun. 19, 1982 [JP] Japan .............................. 57-91718[U]

[51] Int. Cl.³ .............................................. B60P 3/12
[52] U.S. Cl. ................................. 280/402; 280/476 R;
414/563
[58] Field of Search ........... 280/402, 418, 475, 476 R;
414/563

[56] References Cited

U.S. PATENT DOCUMENTS

| | | | |
|---|---|---|---|
| 3,434,607 | 3/1969 | Nelson | 414/563 |
| 3,434,608 | 3/1969 | Nelson | 414/563 |
| 3,570,690 | 3/1971 | Wegener et al. | 414/563 |
| 3,997,191 | 12/1976 | Morgan | 280/475 |

FOREIGN PATENT DOCUMENTS 56-17224 4/1981 Japan .
926738 5/1963 United Kingdom ................ 280/402

Primary Examiner—Joseph F. Peters, Jr.
Assistant Examiner—D. Lynn Fugate
Attorney, Agent, or Firm—Birch, Stewart, Kolasch & Birch

[57] ABSTRACT

A vehicle towing trailer comprises a substantially T-shaped trailer body including an axially extending elongated frame and a cross frame connected to a rear end of the elongated frame, a swivel platform supported on the cross frame, a lift arm mounted on the trailer body for lifting and lowering the rear end of the trailer body, a pair of wheel assemblies each including one or more ground engaging wheels supported by a bracket which is detachable to the trailer body by insertion of one or more axially extending male members into one or more cooperating female members from a front side toward a rear side of the cross frame in a direction opposite to a running direction of the trailer.

10 Claims, 11 Drawing Figures

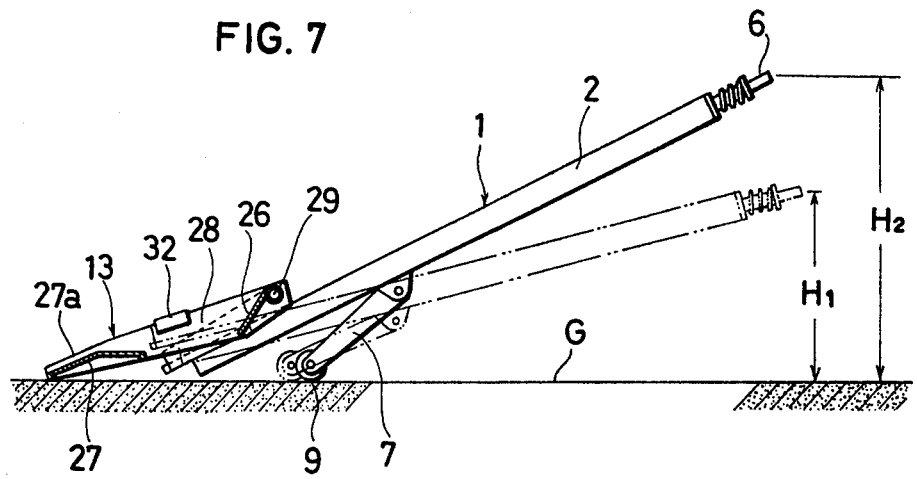
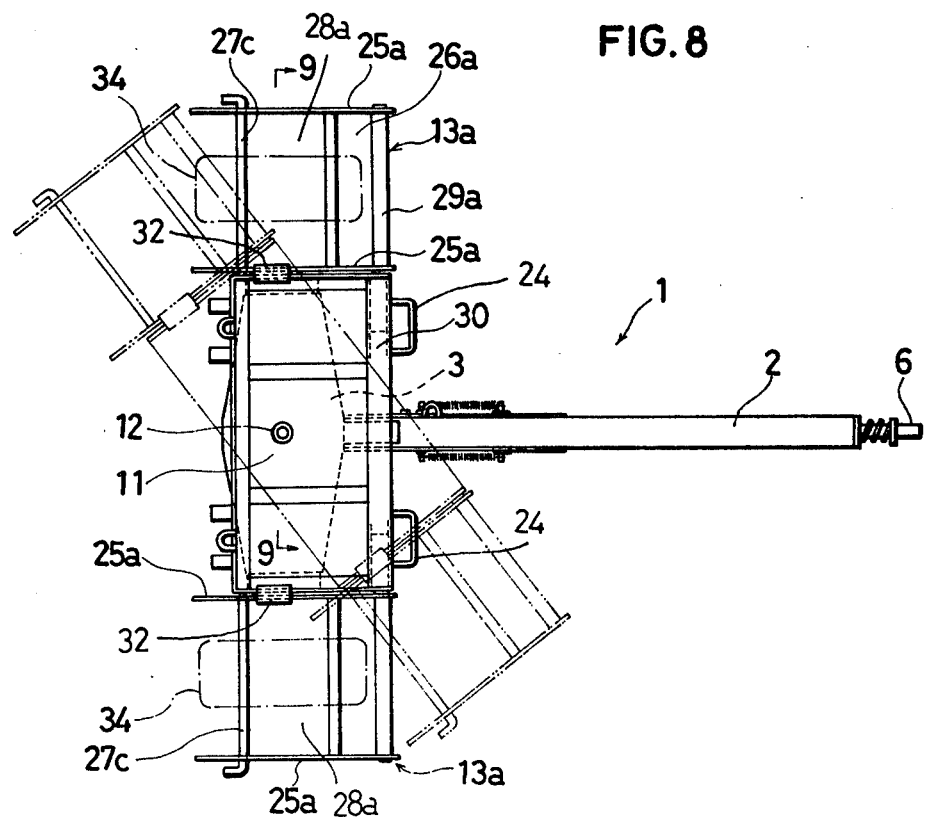

VEHICLE TOWING TRAILER

BACKGROUND AND SUMMARY OF THE INVENTION

This invention relates to a vehicle towing trailer of such a type as is trailed by a pulling vehicle to which a front end of the trailer is detachably connected by means of a hitching device.

The conventional vehicle towing trailer of the above type generally has a pair of ground engaging wheels non-removably mounted to the underside of the trailer end portion and also has a wheel supporting frame mounted on the rear body of the trailer so as to swivel in a horizontal plane and slide back and forth in the axial direction for the convenience of placing the front or the rear wheels of a vehicle to be towed thereon. In operation, the vehicle wheels are placed on the slid-down wheel supporting frame, and then the wheel supporting frame together with the vehicle wheels supported thereon is slidably pulled up by means of a winch provided on the trailer body. Thus, the conventional trailer of this type has the following disadvantages, the first being that the non-removability of the ground engaging wheels from the trailer body invites a considerably great height or distance from the ground surface to a level where the wheel supporting frame lies, thereby to cause an obstacle to a quick and simple placing of the wheels of the vehicle to be towed onto the wheel supporting frame; the second being that the aforesaid considerably great height or distance inevitably invites a considerably great axial length of the trailer body in the viewpoint of preventing an excessively steep angle of the slideway for the wheel supporting frame; and the third being that the inevitable large dimension of the trailer body generally invites high costs in manufacture, transportation, storage and maintenance as well as inconvenience in use.

In order to eliminate the above-discussed disadvantages, the inventor of the present invention previously proposed an improved vehicle towing trailer as disclosed in Japaness Utility Model Publication No. 56-17224 published on Apr. 22, 1981 (application No. 54-14119), in which a pair of spaced ground engaging wheel assemblies are removably mounted to the underside of the trailer end portion, and the trailer body is so constructed as to be raised and lowered by means of a jack mounted thereon. Thus, in order to place the wheels of a vehicle to be towed onto a pair of wheel supporting frames, the rear end of the trailer is lowered after the ground engaging wheel assemblies have been removed from the trailer body. After the wheels of the vehicle to be towed have been seated on the wheel supporting frames, the rear end of the trailer is raised up by means of the jack so that the removed ground engaging wheel assembly can be re-mounted to the trailer body. After the ground engaging wheel assemblies have been re-mounted, the jack is withdrawn into its resting position so that the trailer body is slightly lowered until the ground engaging wheels are supported on the ground. The removability of the ground engaging wheel assemblies from the trailer body enables the rear end of the trailer body to be lowered down toward the ground surface and permits an easy placing of the wheels of the vehicle to be towed onto the pair of wheel supporting frames with the aid of a gentle slope of a ramp plate. Further, dimension of the trailer body can be minimized, and the winch and the slidable construction of the wheel supporting frame are no longer required.

However, the trailer as disclosed in Japanese Utility Model Publication No. 56-17224 is so constructed that the re-mounting of the pair of ground engaging wheel assemblies must be carried out by inserting a mounting shaft extending upwardly from a wheel supporting bracket, which supports a ground engaging wheel, into each of a pair of spaced tubular sockets extending downwardly from the underside of either end of the rear frame which extends transversely of the longitudinal axis of the trailer body. In order to carry out attachment or re-mounting of the ground engaging wheel assembly, an operator must bend himself down at a position very close to one side of the rear frame of the trailer. As described above, the re-mounting of the ground engaging wheel assembly to the trailer body is carried out with the wheels of the vehicle to be towed placed on the wheel supporting frames while the jack is in its operative position to maintain the rear end of the trailer body in its raised position. Thus, if the jack at this stage suddenly loses its balance or becomes inoperative unexpectedly by a certain reason or other, the operator may be caught under the falling trailer body or the vehicle supported on the same. Therefore, the trailer of this prior art is occasionally dangerous in practical use.

It is an object of the present invention to eliminate the disadvantages in the above-described vehicle towing trailer as disclosed in Japanese Utility Model Publication No. 56-17224.

Another object of the invention is to provide an improved vehicle towing trailer which is safe, simple, convenient and easy to use.

A further object of the invention is to provide an improved vehicle towing trailer which permits a minimized dimension and manufacture at a low cost.

One feature of the present invention is that the re-mounting of a pair of detachable ground engaging wheel assemblies to the trailer body can be carried out by an operator who stands in a safety zone near one side of a rear frame of the trailer body. In order to realize this feature, the trailer according to the invention has a substantially T-shaped body comprising an elongated tubular frame extending in parallel with a longitudinal axis of the trailer body, and a cross frame connected to the rear end of the elongated frame and extending transversely of the same, so that the re-mounting of each of a pair of wheel assemblies can be carried out by an operator who stands aside the elongated tubular frame at a position between the cross frame and a rear end of a pulling vehicle to which the front end of the elongated frame is detachably connected. At this position, the operator can easily get out of danger of being caught under the falling trailer body or the vehicle placed on the wheel supporting frames of the trailer.

Another feature of the invention is that the re-mounting of the wheel assembly can be performed in a quick and simple manner by merely inserting male members formed with a wheel supporting bracket into female members formed with the cross frame, from the front side toward the rear side of the cross frame, viz. in an axial direction opposite to a running direction of the trailer. This feature also enhances safety in the re-mounting of the wheel assembly to the trailer body and prevents unexpected disengagement of the male members out of the female members when the trailer is running.

A further feature of the invention is that, in order to meet a necessity in such a particular case where a vehicle to be towed is so greatly damaged that neither the front wheels nor the rear wheels thereof can be seated on a pair of wheel supporting frames, a certain body portion of the vehicle to be towed can be directly supported on a supporting platform of the trailer. In order to realize this feature, the supporting platform is arranged so as to turn horizontally about a vertical axis while the pair of wheel supporting frames are pivotally and detachably mounted to the platform at opposite ends thereof for the convenience of placing the greatly damaged vehicle body directly thereon.

A still further feature of the invention is that the trailer is applicable to various height or distance from a ground surface to a level where a hitching member fixed to a pulling vehicle lies. In order to realize this feature, each of the pair of wheel supporting frames is arranged so as to be pivotally movable about a horizontal axis, so that, when the trailer end is lowered for placing the wheels of the vehicle to be towed onto the wheel supporting frames, an inclination angle of each of the wheel supporting frames with respect to the ground surface is not so steep regardless of a value of the aforesaid height or distance.

A still further feature of the invention is that, in particular embodiments as illustrated in FIGS. 10 and 11, it is no longer necessary to pull up the vehicle to be towed until its wheels can be seated in the pair of wheel supporting frames. In order to realize this feature, each of the pair of wheel supporting frames has a detachable cross bar selectively engageable with a pair of a plural number of supporting holes or slots formed in each of a pair of side plates constituting the wheel supporting frame. The cross bar is removed from the wheel supporting frame before a wheel of the vehicle to be towed is inserted into position between the pair of side plates. After the wheel is properly interposed, the cross bar is mounted to the pair of side plates by engaging the same with a selected one pair among a plurality of opposed pairs of the supporting holes or slots, Thus, the wheel of the vehicle to be towed can be seated by its own weight into the wheel supporting frame as the rear end of the trailer is raised by means of a jack or lift arm mounted on the trailer body. This feature also enhances applicability to several dimensions of the wheel of the vehicle to be towed.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become obvious to those skilled in the art from this detailed description.

BRIEF DESCRIPTION OF THE DRAWINGS

FIGS. 6 and 7 are side elevational views showing operation of the trailer;

FIG. 8 is a top plan view showing another embodiment of the present invention;

DESCRIPTION OF THE PREFERRED EMBODIMENTS

Figure 1:
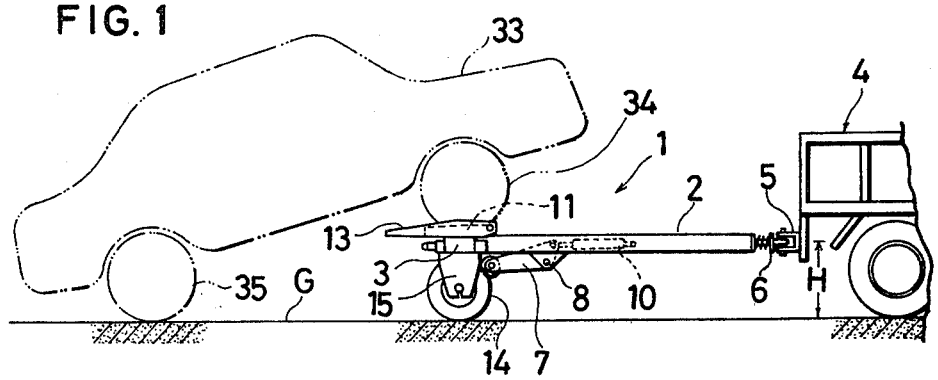
FIG. 1 is a side elevational view of a vehicle towing trailer, in operative position, according to the present invention.

Referring now to the accompanying drawings, in particular to FIGS. 1 to 7 first, a vehicle towing trailer according to the present invention is illustrated as having a substantially T-shaped trailer body 1 which comprises a hollow, elongated frame 2 and a cross frame 3. The elongated frame 2 extends in parallel with an axis of the trailer while the cross frame 3 is connected to the rear end of the elongated frame 2 and extends transversely of the frame 2. The front end of the frame 2 is provided with a known connecting member 6 detachable to a known hitching member 5 secured to the rear of a pulling vehicle 4, conventionally.

A lift arm 7, which serves as a kind of jack, is pivotally connected at its upper end to the elongated frame 2 so as to move about a support pin 8. The lower or free end of the lift arm 7 is provided with a pair of spaced rollers 9 which are engageable with a ground G when lowered. The upper end of the lift arm 7 is operatively connected to a known hydraulic drive 10 (shown in phantom line in FIG. 1) which may be disposed within the elongated frame 2, so that the trailer body 1 can be lifted or lowered by means of the arm 7, conventionally.

A swivel platform 11 is mounted via a pivot pin 12 on the cross frame 3, so that the platform 11 can turn horizontally about the pin 12. A pair of wheel supporting frames 13 are mounted to the platform 11 at opposite ends thereof, so that front wheels 34 or rear wheels 35 of a vehicle to be towed can alternatively be supported thereon, as shown in FIG. 1. Each of the wheel supporting frames 13 may preferably be constructed so as to be detachable from the platform 11, as will be hereinafter described in detail. The platform 11 may preferably be designed so that an appropriate portion, for example an axle casing (not shown), of the vehicle to be towed can be directly placed on the platform, in view of such a particular case where the vehicle 33 to be towed has been so greatly damaged that neither the front wheels nor the rear wheels thereof can be seated on the supporting frames 13.

One or two wheels 14 are freely rotatably supported by each of a pair of spaced support brackets 15 each of which is detachably mounted to the underside of the cross frame 3. For the purpose of realizing easy attachment to and removal from the cross frame 3, each of the pair of brackets 15 is formed with one or more male members or rails 16 each of which is integral with the upperside wall 15a of each bracket via a connecting beam 17 and extends in parallel with the axis of the elongated frame 2, while the cross frame 3 is formed at either side with one or more female members or socket sleeves 18 for receiving the rails 16 therein. The rails and the sleeves should be so constructed that the former are longitudinally slidable with respect to the latter but prevented from dropping off the latter. Each of the sleeves 18 is formed with a longitudinal slit 19 for guiding and receiving the connecting beam 17 which is slidable within the sleeve. Thus, the brackets 15 can be detachably mounted to the underside of the cross frame 3 by inserting the rails 16 and the beams 17 into the sleeves 18 and the slits 19, respectively, preferably from the front end (the cross frame end located on the side of the pulling vehicle 4) toward the rear end of the cross frame 3.

In place of the above described rail-sleeve construction, the sleeves or female members may be formed in the upperside wall of the wheel supporting bracket 15 while the cross frame 3 may be formed with the rails or male members, so that the bracket can be detachably mounted to the underside of the cross frame by insertion of the rails into the sleeves.

Figure 3:
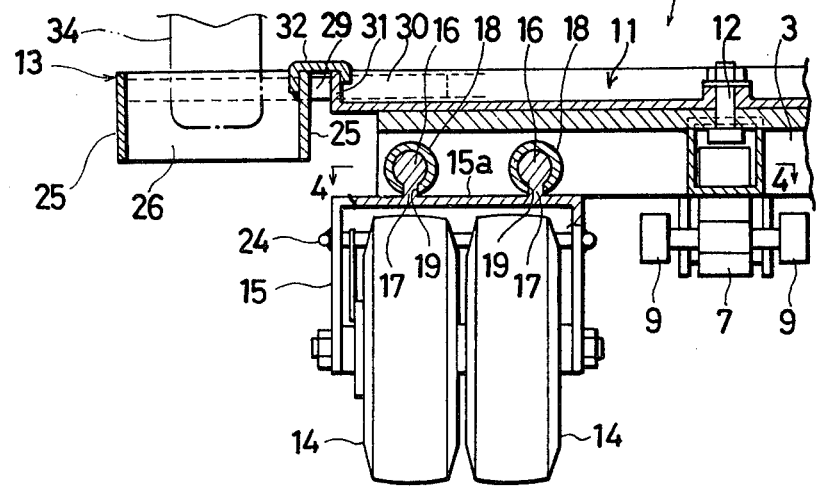
FIG. 3 is an enlarged section taken along the line 3—3 of FIG. 2.
Figure 4:
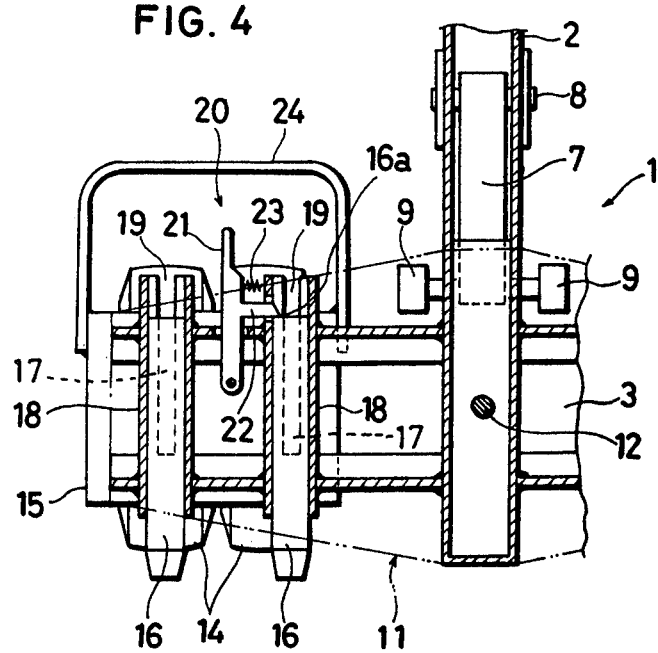
FIG. 4 is a longitudinal section taken along the line 4—4 of FIG. 3.

As best shown in FIG. 4, each of the opposite ends of the cross frame 3 is provided at its front side (the side facing the pulling vehicle 4) with a known retaining mechanism 20 for preventing the inserted rails 16 from unexpectedly slipping out of the sleeves 18. Such retaining mechanism can be realized in various ways. For example, the mechanism 20 may comprises a spring-loaded pivotal lever 21 having a stopper claw 22 formed at one side thereof so that the claw end can be pushed into at least one of the sleeves 18 through a hole or opening formed in the sleeve wall for engagement with the rail end 16a. Thus, the rail 16 inserted into the sleeve 18 can be held in position by the aid of the known function of a spring 23 which urges the lever 21 in one direction. The bracket 15 may preferably be formed with a handle 24 (FIGS. 3 and 4) for better portability of the assembly 14, 15 as well as easier attachment and removal of the assembly to and from the cross frame.

Figure 2:
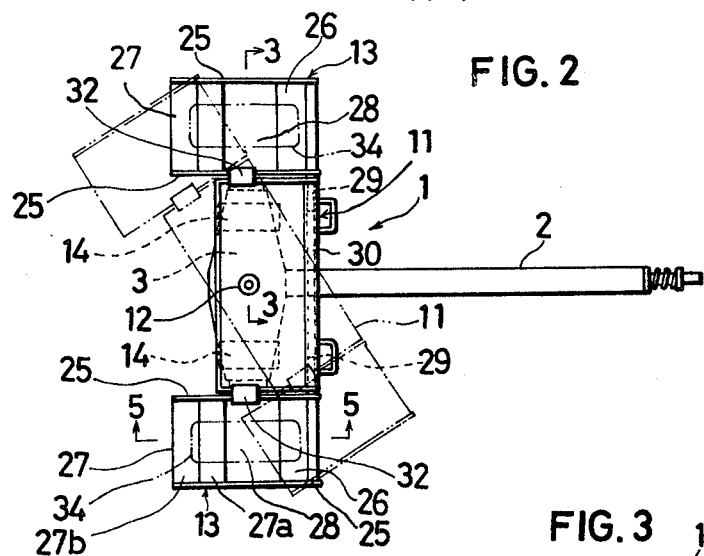
FIG. 2 is an enlarged top plan view of the trailer.
Figure 5:
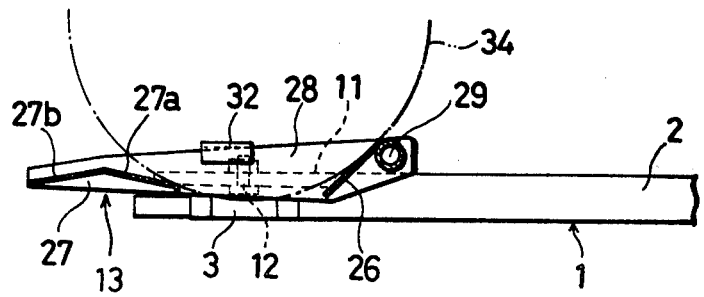
FIG. 5 is an enlarged longitudinal section taken along the line 5—5 of FIG. 2.

As best shown in FIGS. 2, 3 and 5, each of the wheel supporting frames 13 comprises a pair of spaced side plates 25, a front and a rear plates 26, 27 both extending between the pair of spaced side plates 25. The front plate 26 may preferably be inclined down rearwardly. The rear plate 27 may preferably have a front portion 27a inclined down forwardly and a rear portion 27b gently inclined down rearwardly. The pair of side plates 25, the front plate 26 and the front portion 27a of the rear plate 27 are arranged so as to cooperate to provide a wheel receiving recess or seat 28 in which a part of the wheel 34 of the vehicle 33 to be towed is seated.

Each of the supporting frames 13 may preferably be detachably mounted to either end of the swivel platform 11 by inserting a connecting bar 29, which is rigidly secured to and extends from each of the supporting frames, into a tubular socket 30 provided preferably along the front side of the platform 11, so that each of the supporting frames 13 can pivotally move about a common axis of the connecting bar 29 and the socket 30. However, the downward pivotal movement of each of the supporting frames about the aforesaid axis is restricted by means of a restricting member 32 which is fixedly secured to the inner side plate 25 of each of the supporting frames so as to be engageable with an adjacent side edge 31 of the platform 11, as shown in FIG. 3.

Figure 6:
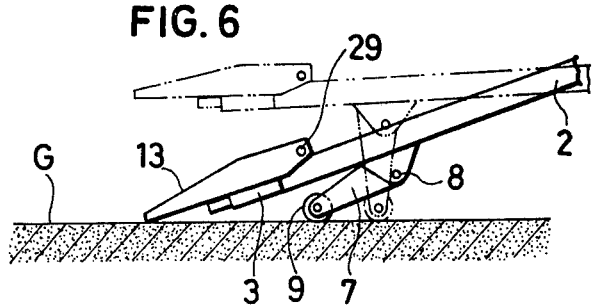

In operation of the above described embodiment, the wheel assembly, which comprises the ground engaging wheels 14 supported by the brackets 15, is removed from the cross frame 3 by pulling the handle 24 axially forwardly and then the lift arm 7 is turned upwardly until the rear end of the trailer is lowered down to take a position as shown in the solid line in FIG. 6. In such position, the trailer can be drawn by means of the ground engaging rollers 9 to a location where the pair of the front or the rear wheels of the vehicle 33 to be towed can be pulled up along the rear plates 27 serving ramps onto the supporting frames 13 for seating therein. Incidentally, the underside of the cross frame 3 may be provided with a pair of ground engaging rollers (not shown) which are similar to the aforesaid rollers 9.

In such a particular case where one or both of the wheels of the vehicle 33 to be towed have been too greatly damaged or punctured to permit the ascent along the ramp plate 27, a suitable front or rear part of the body of the vehicle 33 may be directly supported on the platform 11. For this purpose, each of the wheel supporting frames 13 is removed from the platform 11 by pulling the connecting bar 29 out of the tubular socket 30 after each of the supporting frames 13 has been turned upwardly about the bar 29 for disengagement of the restricting member 32 from the side edge 31, so that the platform 11 can be placed underneath the front or rear part of the vehicle 33 appropriately.

Then, the lift arm 7 is lowered down by means of the hydraulic drive 10 until the trailer end is lifted up to take a position as shown in the phantom lines in FIG. 6. Then, each pair of the ground engaging wheels 14 are attached to the underside of the cross frame 3 by simply inserting the male members 16 into the female members 18. Finally, the lift arm 7 is raised up to its resting position, so that the wheels 14 can be engaged with the ground surface G to support the trailer body 1 without the aid of the lift arm 7, as substantially shown in FIG. 1.

In the above operation, the attachment of the wheel assembly 14, 15 to the underside of the trailer body 1 can be carried out by an operator who stands aside the elongated bar-like frame 2 at a position between the cross frame 3 and the rear end of the pulling vehicle 4. Therefore, the operator can easily get out of danger of being caught under the trailer body 1 when it loses its balance or gets lowered down unexpectedly.

The male members 16 are surely prevented from unexpected disengagement from the female members 18 during towing operarion because the male members are inserted into the female members in the axial direction opposite to the running direction of the trailer.

As is well known, a height or distance (H)(FIG. 1) from the ground surface G to a hitching member 5 is variable in dependence with various types of pulling vehicles 4. On the other hand, as described above, the trailer end must be lowered down until the rear end of the ramp plate 72 gets into contact with the ground surface G as shown in FIG. 7. Consequently, if each of the pair of wheel supporting frames 13 is rigidly and immovably secured to the platform 11, it is very difficult for the wheels of the vehicle 33 to be towed to ascend the rear portion 27b of the ramp plate 27 in order to be seated in the frames 13, in such a particular case where the aforesaid distance (H) is so great while the entire axial length of the trailer body 1 is not so very long with the result that a sloping angle of the rear portion 27b of the ramp plate 27 is so steep. However, according to the present invention, each of the wheel supporting frames 13 is pivotally movable about the axis of the connecting bar 29, so that the sloping angle of the rear portion 27b of the ramp plate 27 is prevented from becoming too steep when the distance (H) is varied, for example, from a smaller value ($H_1$) to a greater value ($H_2$) as shown in FIG. 7. Thus, the trailer according to the present invention can be applied to various types of pulling vehicles with various values of the distance (H) from the ground surface G to a level where the hitching member 5 lies, while minimizing the entire axial length of the trailer body.

FIGS. 8 to 11 illustrate another embodiment according to the present invention wherein a pair of modified wheel supporting frames 13a are employed in place of the above described corresponding frames 13. In the following description, it should be noted that each of component elements designated by such reference numerals as identical with those utilized in the foregoing description made with reference to FIGS. 1 to 7 is substantially the same in construction and function as the corresponding element of the preceding embodiment. More particularly, the component elements 1 to 12, 14 to 24, and 30 to 35 of the following embodiment are substantially the same in construction and function as those corresponding elements designated by the identical reference numerals in the preceding embodiment, and thus, the detailed description on those substantially identical elements 1 to 12, 14 to 24, and 30 to 35 are not fully repeated hereinafter.

Figure 9:
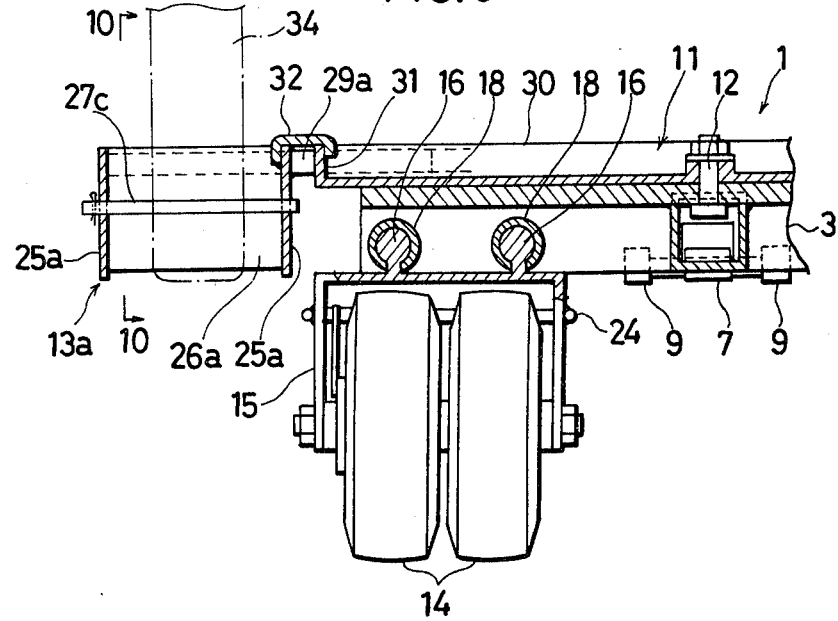
FIG. 9 is an enlarged cross section taken along the line 9—9 of FIG. 8.

Each of the wheel supporting frames 13a comprises a pair of spaced side plates 25a, a front plate 26a connecting the pair of side plates 25a, and a detachable cross bar 27c extending between the spaced rear end portions of the pair of side plates 25a. The front plate 26a may be of such construction as substantially same with or similar to that of the front plate 26 utilized in the preceding embodiment and has a connecting bar 29a rigidly secured thereto and extending therefrom into a tubular socket 30 which is fixedly supported on the front side of a swivel platform 11, so that each of the supporting frames 13a can pivotally move about a common axis of the connecting bar 29a and the tubular socket 30. However, the downward pivotal movement of each of the supporting frames 13a about the aforesaid axis is restricted by means of a restricting member 32 which is fixedly secured to the inner side plate 25a of each of the supporting frames 13a so as to be engageable with an adjacent side edge 31 of the platform 11, as shown in FIG. 9.

The front plate 26a, the pair of side plates 25a and the cross bar 27c are so arranged as to cooperate to provide a wheel receiving recess or seat 28a in which a part of the wheel 34 or 35 of the vehicle 33 to be towed is seated.

Figure 10:
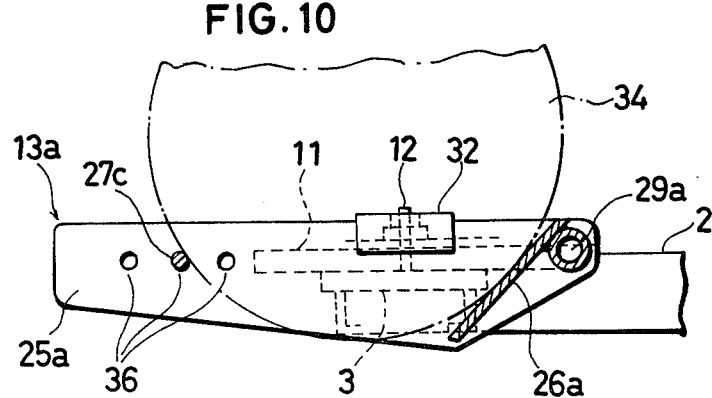
FIG. 10 is an enlarged longitudinal section taken along the line 10—10 of FIG. 9.

As shown in FIG. 10, the rear portion of each of the pair of side plates 25a is formed with a plural number of supporting holes 36 which are axially aligned in spaced relation with each other, so that the detachable cross bar 27c can be inserted through a selected pair of opposed holes 36 of the side plates 25a. In FIG. 10, a pair of opposed middle holes 36 are illustrated as having the cross bar 27c inserted therethrough.

Figure 11:
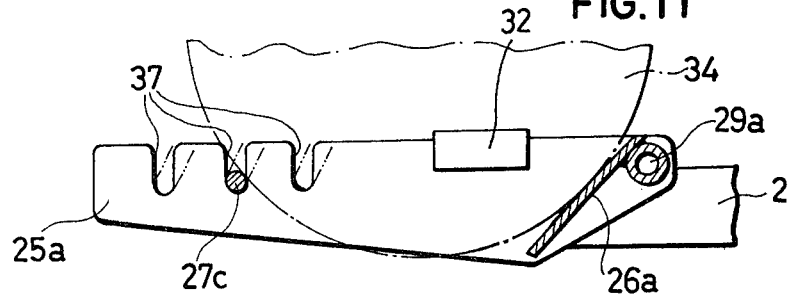
FIG. 11 is a similar view to FIG. 10, but showing a modification of a wheel supporting frame.

In place of the supporting holes 36, a plural number of supporting slots 37 or the like may be formed in each of the pair of side plates 25a, as illustrated in FIG. 11, so that the cross bar 27c can be selectively supported by a pair of opposed slots 37. Each of the slots 37 may be formed so as to extend either vertically as shown in solid lines or inclinedly as shown in phantom lines, in FIG. 11. The inclined slots may be somewhat advantageous in the viewpoint of preventing unexpected disengagement of the cross bar 27c out of the slots.

In operation of this second embodiment, the wheel assembly 14, 15 is removed from the cross frame 3 by pulling the handle 24 axially forwardly and then the lift arm 7 is turned upwardly until the rear end of the trailer is lowered down to take a position as shown in the solid line in FIG. 6. As a next step, after removing the cross bar 27c from each of the pair of wheel supporting frames 13a, the trailer is moved to such a position where a lower part of each of the pair of wheels 34 or 35 of the vehicle 33 to be towed is in contact with the front plate 26a and interposed between the pair of side plates 25a of each of the supporting frames 13a. Then, the cross bar 27c is mounted on each of the supporting frames 13a by engaging the bar 27c with a selected pair of the supporting holes 36 or the slots 37 as illustrated in FIGS. 10 and 11.

Then, the lift arm 7 is lowered down by means of the hydraulic drive 10 until the trailer end is lifted up to take a position as shown in the phantom line in FIG. 6. At this stage, both of the wheels of the vehicle to be towed 33 are stably seated by weight in the recesses 28a each defined by the pair of side plates 25a, the front plate 26a and the cross bar 27c. After that, each pair of the ground engaging wheels 14 are attached to the underside of the cross frame 3 in the same manner as already described hereinbefore.

Finally, the lift arm 7 is raised up to its resting position, so that the wheels 14 can be engaged with the ground surface G to support the trailer body 1 without the aid of the lift arm 7, as substantially shown in FIG. 1.

As will be readily understood from the above description, the second embodiment is more advantageous in seating the wheels of the vehicle 33 to be towed into the pair of wheel supporting frames 13a because it is no longer necessary to pull up the vehicle 33 in order that its wheels 34 or 35 ascend the ramp plates 27. Thus, the trailer as the second embodiment is more convenient in practical use as compared to the first embodiment.

In the particular case where one or both of the wheels of the vehicle 33 to be towed have been too greatly damaged or punctured to permit the seating of the wheels 34 or 35 in the supporting frames 13a, the frames 13a should be removed from the platform 11 in the same manner as already described hereinbefore for directly supporting a part of the vehicle body on the platform 11.

It will be apparent that increase of the number of the supporting holes 36 or slots 37 facilitates a better applicability to various dimensions of the wheels of the vehicle 33 to be towed.

The detachable construction of the wheel supporting frames 13, 13a permits an easy storage and transportation in addition to the particular advantages in utility already described hereinbefore.

It is apparent that the wheel of the vehicle 33 to be towed can be seated into the wheel supporting frame 13a without removing the cross bar 27c from the pair of side plates 25a, by forcing the vehicle wheel over the cross bar 27c.

The present invention being thus described, it will be obvious that same may be varied in many ways. Such variations are not to be regarded as a departure from the spirit and scope of the invention, and all such modifications as would be obvious to one skilled in the art are intended to be included within the scope of the following claims.

I claim:

1. A vehicle towing trailer of such a type as is trailed by a pulling vehicle to which a front end of the trailer is detachably connected by a hitching means, comprising:

a substantially T-shaped trailer body including an elongated frame extending in parallel with a longitudinal axis of said trailer body, and a cross frame connected to a rear end of said elongated frame and extending transversely of said longitudinal axis;

a swivel platform supported on said cross frame and movable in a substantially horizontal plane about a vertical axis;

said swivel platform being adapted to support a portion of a vehicle to be towed;

a pair of wheel supporting frames in each of which a wheel of said vehicle to be towed is seated;

one of said pair of wheel supporting frames being detachably mounted to one end of said platform, and another of said pair of wheel supporting frames being detachably mounted to another end of said platform;

jack means mounted on said trailer body for lifting and lowering a rear end of said trailer body;

a pair of wheel assemblies each including at least one ground engaging wheel rotatably supported by a bracket and a handle means connected to said bracket for attachment and removal of said wheel assembly to and from said cross frame;

said bracket being detachable to said cross frame by insertion of at least one male means into at least one female means from a front side toward a rear side of said cross frame in an axial direction opposite to a running direction of the trailer; and said male and female means being relatively axially slidable with each other for easy engagement and disengagement.

2. The trailer as defined in claim 1, wherein
said bracket is formed with at least one said male means, and
said cross frame is formed with at least one said female means.

3. The trailer as defined in claim 1, wherein
said bracket is formed with at least one said female means, and
said cross frame is formed with at least one said male means.

4. The trailer as defined in claims 1, 2 or 3, wherein
said male means is in the form of an axially extending rail, and
said female means is in the form of a socket sleeve.

5. The trailer as defined in claim 1, wherein
each of said pair of wheel supporting frames is pivotally mounted to said platform, and
a means is provided for restricting excessive downward pivotal movement of each of said wheel supporting frames.

6. The trailer as defined in claim 1, wherein
each of said pair of wheel supporting frames has a rear plate serving as a ramp for ascent and descent of said wheel of said vehicle to be towed, and
said rear plate is angularly displaceable with respect to said platform within a certain limited range for preventing a steep inclination angle of said rear plate with respect to a ground surface on which said trailer lies.

7. The trailer as defined in claim 1, wherein
each of said pair of wheel supporting frames includes a pair of side plates and a cross bar, and
said cross bar is detachably mounted to said pair of side plates.

8. The trailer as defined in claim 7, wherein
each of said pair of side plates has a plurality of supporting holes with which said cross bar is selectively engaged.

9. The trailer as defined in claim 7, wherein
each of said pair of side plates has a plurality of supporting slots with which said cross bar is selectively engaged.

10. The trailer as defined in claim 1, wherein
said jack means is in the form of a hydraulically operated lift arm which is pivotally connected at its upper end to said elongated frame, and
said lift arm has a pair of ground engaging rollers rotatably mounted at its lower end.

* * * * *